(12) United States Patent
Kim (10) Patent No.: US 7,783,761 B2
(45) Date of Patent: *Aug. 24, 2010

(54) SCHEME FOR DYNAMICALLY CONNECTING I/O DEVICES THROUGH NETWORK

(75) Inventor: Han-gyoo Kim, Seoul (KR)

(73) Assignee: Zhe Khi Pak, Moscow (RU)

( * ) Notice: Subject to any disclaimer, the term of this patent is extended or adjusted under 35 U.S.C. 154(b) by 926 days.

This patent is subject to a terminal disclaimer.

(21) Appl. No.: 10/195,817

(22) Filed: Jul. 15, 2002

(65) Prior Publication Data
US 2003/0014569 A1    Jan. 16, 2003

Related U.S. Application Data

(60) Provisional application No. 60/305,923, filed on Jul. 16, 2001.

(51) Int. Cl.
*G06F 15/16* (2006.01)

(52) U.S. Cl. ............... 709/227; 709/201; 709/216; 709/217

(58) Field of Classification Search ........... 709/201, 709/203, 211, 216, 217, 219, 236, 253, 318, 709/223, 227–229
See application file for complete search history.

(56) References Cited

U.S. PATENT DOCUMENTS

| | | | |
|---|---|---|---|
| 5,297,262 A * | 3/1994 | Cox et al. ............ 710/36 |
| 5,329,619 A | 7/1994 | Page et al. | |
| 5,426,427 A | 6/1995 | Chinnock et al. | |
| 5,463,772 A | 10/1995 | Thompson et al. | |
| 5,513,314 A | 4/1996 | Kandasamy et al. | |
| 5,524,247 A | 6/1996 | Mizuno | |
| 5,553,287 A * | 9/1996 | Bailey et al. ......... 709/201 |
| 5,566,331 A * | 10/1996 | Irwin et al. ........... 707/10 |
| 5,640,603 A * | 6/1997 | Meritt et al. ........... 710/38 |
| 5,721,818 A | 2/1998 | Hanif et al. | |
| 5,774,660 A | 6/1998 | Brendel et al. | |
| 5,781,550 A | 7/1998 | Templin et al. | |
| 5,812,930 A * | 9/1998 | Zavrel ............... 725/62 |
| 5,838,916 A | 11/1998 | Domenikos et al. | |
| 5,889,942 A * | 3/1999 | Orenshteyn ........... 726/3 |

(Continued)

FOREIGN PATENT DOCUMENTS

DE    19610840    9/1997

(Continued)

OTHER PUBLICATIONS

Japanese Office Action, App. No. 555298/2002, Jan. 9, 2007.

(Continued)

*Primary Examiner*—Faruk Hamza
(74) *Attorney, Agent, or Firm*—Rothwell, Figg, Ernst & Manbeck, P.C.

(57) ABSTRACT

A scheme for dynamically connecting I/O devices through a network is disclosed. It enables separating I/O devices from a host system unit and connecting them to the host system unit through a network. In one preferred embodiment, provided in the host side is a converter that encapsulates an I/O command into one or more data link frames so that the frames containing the I/O command are sent through the network. Also provided in the device side is a counter-converter that retrieves the I/O command from the data link frames received through LAN. The network may be either a wired or wireless network.

3 Claims, 9 Drawing Sheets

U.S. PATENT DOCUMENTS

| | | | |
|---|---|---|---|
| 5,987,523 | A | 11/1999 | Hind et al. |
| 5,987,627 | A | 11/1999 | Rawlings, III |
| 5,999,808 | A | 12/1999 | LaDue |
| 6,047,307 | A | 4/2000 | Radko |
| 6,085,234 | A | 7/2000 | Pitts et al. |
| 6,128,644 | A | 10/2000 | Nozaki |
| 6,128,690 | A | 10/2000 | Purcell et al. |
| 6,167,490 | A | 12/2000 | Levy et al. |
| 6,175,869 | B1 | 1/2001 | Ahuja et al. |
| 6,216,202 | B1 | 4/2001 | D'Errico |
| 6,314,465 | B1 | 11/2001 | Paul et al. |
| 6,317,775 | B1 | 11/2001 | Coile et al. |
| 6,327,594 | B1 * | 12/2001 | Van Huben et al. ......... 707/200 |
| 6,345,300 | B1 | 2/2002 | Bakshi et al. |
| 6,347,095 | B1 | 2/2002 | Tang et al. |
| 6,356,915 | B1 | 3/2002 | Chtchetkine et al. |
| 6,360,265 | B1 | 3/2002 | Falck et al. |
| 6,366,988 | B1 | 4/2002 | Skiba et al. |
| 6,389,432 | B1 * | 5/2002 | Pothapragada et al. ...... 707/205 |
| 6,393,569 | B1 * | 5/2002 | Orenshteyn ................... 726/4 |
| 6,404,766 | B1 | 6/2002 | Kitai et al. |
| 6,421,753 | B1 | 7/2002 | Hoese et al. |
| 6,449,647 | B1 | 9/2002 | Colby et al. |
| 6,470,389 | B1 | 10/2002 | Chung et al. |
| 6,510,164 | B1 | 1/2003 | Ramaswamy et al. |
| 6,518,965 | B2 * | 2/2003 | Dye et al. ................... 345/419 |
| 6,523,066 | B1 | 2/2003 | Montroy et al. |
| 6,529,996 | B1 | 3/2003 | Nguyen et al. |
| 6,539,446 | B1 | 3/2003 | Chan |
| 6,578,111 | B1 | 6/2003 | Damron et al. |
| 6,594,677 | B2 | 7/2003 | Davis et al. |
| 6,598,068 | B1 | 7/2003 | Clark |
| 6,609,167 | B1 | 8/2003 | Bastiani et al. |
| 6,647,016 | B1 | 11/2003 | Isoda et al. |
| 6,732,104 | B1 | 5/2004 | Weber |
| 6,760,783 | B1 * | 7/2004 | Berry .......................... 719/318 |
| 6,807,581 | B1 * | 10/2004 | Starr et al. .................. 709/250 |
| 6,823,458 | B1 | 11/2004 | Lee et al. |
| 6,834,326 | B1 | 12/2004 | Wang et al. |
| 6,894,981 | B1 | 5/2005 | Coile et al. |
| 6,941,576 | B2 * | 9/2005 | Amit ........................... 725/143 |
| 6,981,076 | B1 * | 12/2005 | Kitten et al. ................. 710/100 |
| 7,010,303 | B2 | 3/2006 | Lewis et al. |
| 7,069,312 | B2 | 6/2006 | Kostic et al. |
| 7,069,350 | B2 | 6/2006 | Fujita et al. |
| 7,076,690 | B1 | 7/2006 | Todd et al. |
| 7,124,128 | B2 | 10/2006 | Springer et al. |
| 7,251,704 | B2 | 7/2007 | Solomon et al. |
| 7,254,578 | B2 | 8/2007 | Devarakonda et al. |
| 7,277,955 | B2 | 10/2007 | Elliott |
| 7,376,133 | B2 | 5/2008 | Gettala et al. |
| 7,383,229 | B2 | 6/2008 | Jacoby |
| 7,664,836 | B2 * | 2/2010 | Kim ........................... 709/222 |
| 2002/0069245 | A1 | 6/2002 | Kim |
| 2003/0018403 | A1 | 1/2003 | Braun et al. |
| 2003/0028614 | A1 | 2/2003 | Jeon |
| 2003/0172149 | A1 | 9/2003 | Edsall et al. |
| 2003/0225834 | A1 | 12/2003 | Lee et al. |
| 2004/0068563 | A1 | 4/2004 | Ahuja et al. |
| 2004/0117813 | A1 | 6/2004 | Karaoguz et al. |
| 2004/0220933 | A1 | 11/2004 | Walker |
| 2005/0042591 | A1 | 2/2005 | Bloom et al. |
| 2005/0110768 | A1 | 5/2005 | Marriott et al. |
| 2005/0149682 | A1 | 7/2005 | Kim |
| 2005/0193017 | A1 | 9/2005 | Kim |
| 2005/0193189 | A1 | 9/2005 | Kim |
| 2006/0004935 | A1 | 1/2006 | Seto et al. |
| 2006/0010287 | A1 | 1/2006 | Kim |
| 2006/0045130 | A1 | 3/2006 | Kim |
| 2006/0067356 | A1 | 3/2006 | Kim |
| 2006/0069884 | A1 | 3/2006 | Kim |
| 2006/0155805 | A1 | 7/2006 | Kim |
| 2007/0008988 | A1 | 1/2007 | Kim |

FOREIGN PATENT DOCUMENTS

| | | |
|---|---|---|
| DE | 10038142 | 2/2001 |
| JP | 10113469 | 5/1998 |
| JP | 10271562 | 10/1998 |
| JP | 11114224 | 4/1999 |
| KR | 2000072493 | 12/2000 |
| KR | 2001088528 | 9/2001 |
| WO | WO99/03297 | 7/1999 |
| WO | WO00/29529 | 5/2000 |

OTHER PUBLICATIONS

Japanese Office Action, App. No. 513300/2003, Feb. 6, 2007.
Blunden et al., "Storage Network Virtualization: What's it all about?", ibm.com/redbooks, XP-002286341, pp. 1-110, Dec. 2000.
Klein, Yaron, "Storage Virtualization with iSCSI Protocol", Internet Draft, XP-015030964, pp. 1-15, Nov. 2, 2000.
Schulz, Greg, "SAN and NAS; Complementary Technologies", http://www.mti.com/white_papers/WP20002.pdf, XP-002201566, pp. 1-7, May 1, 2000.

* cited by examiner

SCHEME FOR DYNAMICALLY CONNECTING I/O DEVICES THROUGH NETWORK

RELATED APPLICATION

This application claims the benefit of co-pending U.S. Provisional Application Ser. No. 60/305,923, filed Jul. 16, 2001, entitled "Method and System for Separating I/O Devices from Computer System Unit and Connecting Them through Network."

BACKGROUND OF THE INVENTION

1. Technical Field

This invention in general relates to computer I/O devices. More specifically, this invention relates to separating I/O devices from a system unit and connecting them through a network such as a local area network.

2. Description of the Related Art

Conventional I/O devices are connected to a host computer through device controllers attached to a system bus internal to the host computer. For example, a monitor is connected to the system bus through a video card, a keyboard through a programmable peripheral interface (PPI), a floppy diskette drive through a floppy drive controller, and a mouse through a serial port. A CD ROM drive is connected to the system bus through an IDE controller or an SCSI controller depending on the type of the CD drive. A hard disk is connected to the system bus through an IDE or SCSI controller depending on the type of the hard disk drive. These controllers for I/O devices are attached to the internal system bus either in a single chip or as an add-on card. Printers are usually attached to the host computer through a parallel port, but sometimes connected to the host computer through a local area network (LAN) such as Ethernet.

Since I/O devices are typically connected to the host computer through device controllers attached to the system bus, the users must be located in the physical proximity to the host computer to access the I/O devices, such as a keyboard, a mouse, a monitor, a floppy diskette drive, or a CD drive. As a result, the users often experience noise and heat from the host computer, and a lack of space due to the space occupied by the system unit. These problems may negatively affect the quality of the work environment and the job efficiency, especially when more than one system unit are used in the work place.

Since each I/O device is tied to one of the host computers, if there is a problem with any of the host computers, the user of the host computer with the attached I/O devices cannot access another host computer without bringing in a new computer. Further, if there is a problem with any of the I/O devices, the user of the I/O device may not be able to use the whole system, and may be required to replace the whole system.

Since the I/O devices are physically attached to the system unit and receive power from the power supply of the system unit, the host computer needs a high-capacity power supply that cause the problems of heat, noise and occupying space. For example, if the power supply and the device controller are close spaced, the power supply may cause noise in the controller, especially in a multimedia controller for high-quality audio or video.

Therefore, there is a need for physically separating I/O devices from the host system and connecting them remotely to the host system.

There is a client/server technology where a client having a CPU, memory and I/O devices is located remotely to the host system. However, the technology does not provide to a solution to the need of physically separating I/O devices because the technology concerns function division between a server and a client by having the server provide the client a function that the client does not have. I/O devices interface with the client and are still attached to the system unit of the client directly.

Printers are sometimes separated from a particular host and connected to the host through a network. But such technology is limited to a printer. What is needed is a general interface that allows all I/O devices such as a keyboard, a monitor, a mouse, and a floppy drive to be separated from the system unit and to be connected to the system unit remotely.

There is the USB (Universal Serial Bus) technology that allows various I/O devices to be connected in a serial bus. It is aimed at improving a conventional system where low speed I/O devices are connected to a system bus such as an ISA bus although the I/O devices are much slower than the CPU and memory. The USB technology, however, cannot dynamically change the connection of the I/O devices. Furthermore, the USB cable is limited to a maximum of 5 meters in distance making it impossible to separate the I/O devices from the host computer system unit. In sum, the USB technology is not a technology to separate I/O device from the host system unit, rather a serial system bus technology of performing efficient I/O.

There is a technology to share I/O devices. For example, a set of a keyboard and a monitor may be shared by several PCs. But the connections between the I/O devices and the system units are usually fixed without providing the ability of dynamically connecting to any host of the host systems at any time. Especially, the I/O sharing technology does not provide the separation between hard disks from the system units.

A host computer may be connected to several terminals using a multi-drop serial line or modem or a telephone line. These connections are fixed connection, lacking the ability of selectively making connections and canceling connection.

Therefore, there is a need for a technology that separates I/O devices from the host system unit and to connect them to the host system unit dynamically.

SUMMARY OF THE INVENTION

It is an object of the present invention to separate I/O devices from the host computer system unit and connect them to the system unit so that I/O devices can be connected to the host system dynamically.

Another object is to separate I/O devices from the host system unit so that the users can work in an environment without being subject to the problems of heat and noise generated from the system unit.

Still another object is to separate I/O devices from the host system unit so that the I/O devices can be serviced more conveniently in case of equipment mal-function.

Yet another object is to physically or functionally separate I/O devices from the host system unit so that optimum I/O devices can be designed without the constraint of connecting to the system bus of the host computer.

The foregoing and other objects are accomplished by separating I/O devices from the host system unit and connecting them to the host system unit through a network. In one preferred embodiment, in the host side is a converter that converts I/O commands into data link frames containing the I/O commands so that the frames can be sent through the network. Also provided is in the device side is a counter-converter that converts the data link frames received through LAN into I/O commands. The network may be either a wired or wireless network.

DETAILED DESCRIPTION OF THE INVENTION

Figure 1:
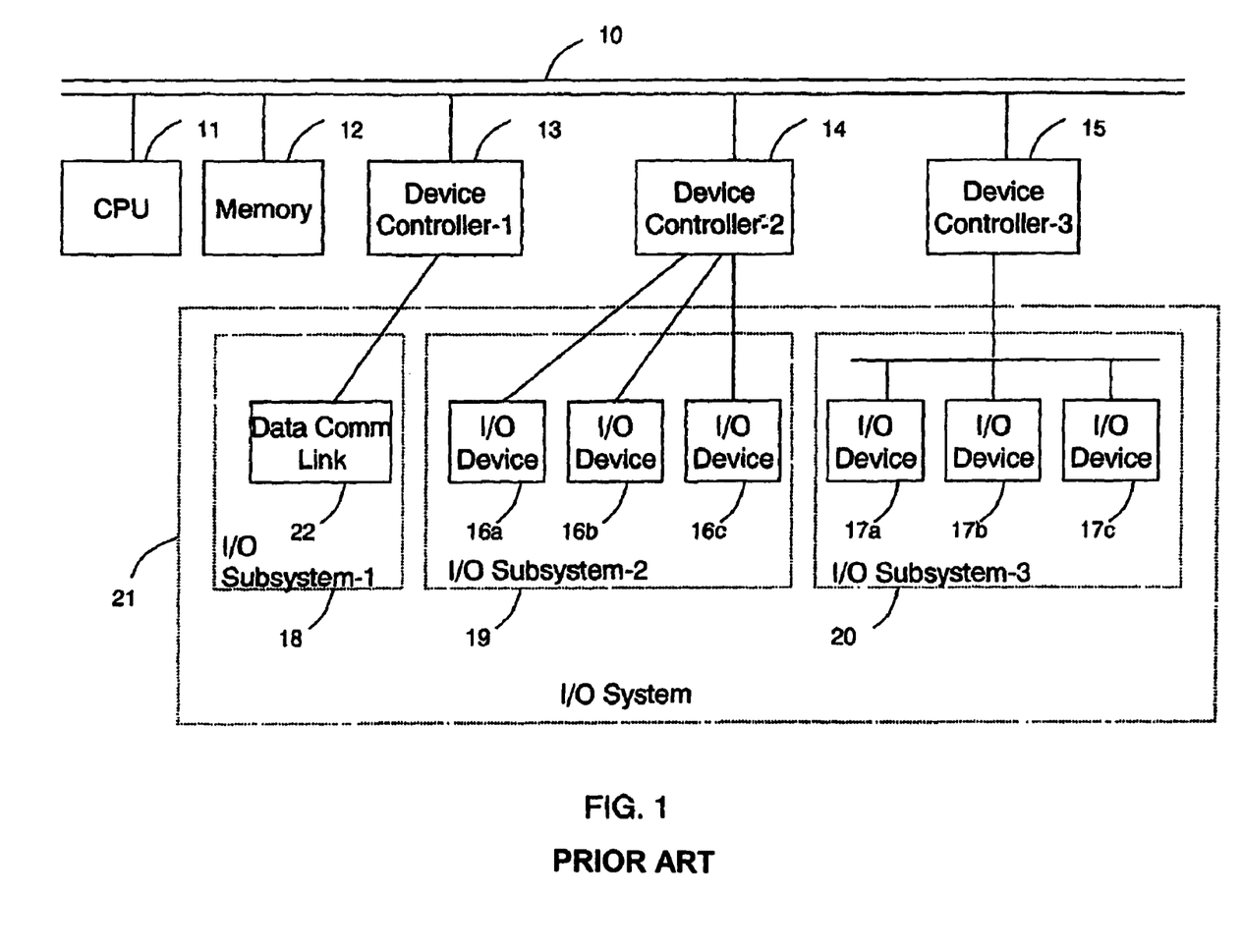
FIG. 1 is a block diagram of various I/O systems that can be connected to a system bus.

FIG. 1 shows a block diagram of a computer system in general having various I/O systems. It shows that I/O system 21 consisting of I/O subsystem-1 18, subsystem-2 19, and subsystem-3 20 is connected to a system bus 10 to which a CPU 11 and memory 12 are also connected. I/O subsystem-1 18 consisting of a data communication link is connected to the system 10 bus through device controller-1 13. I/O subsystem-2 19 consisting of I/O devices 16a, 16b and 16c is connected to the system bus 10 through device controller-2 14. I/O subsystem-3 20 consisting of I/O devices 17a, 17b and 17c is connected to the system bus 10 through device controller-3 15.

Figure 2:
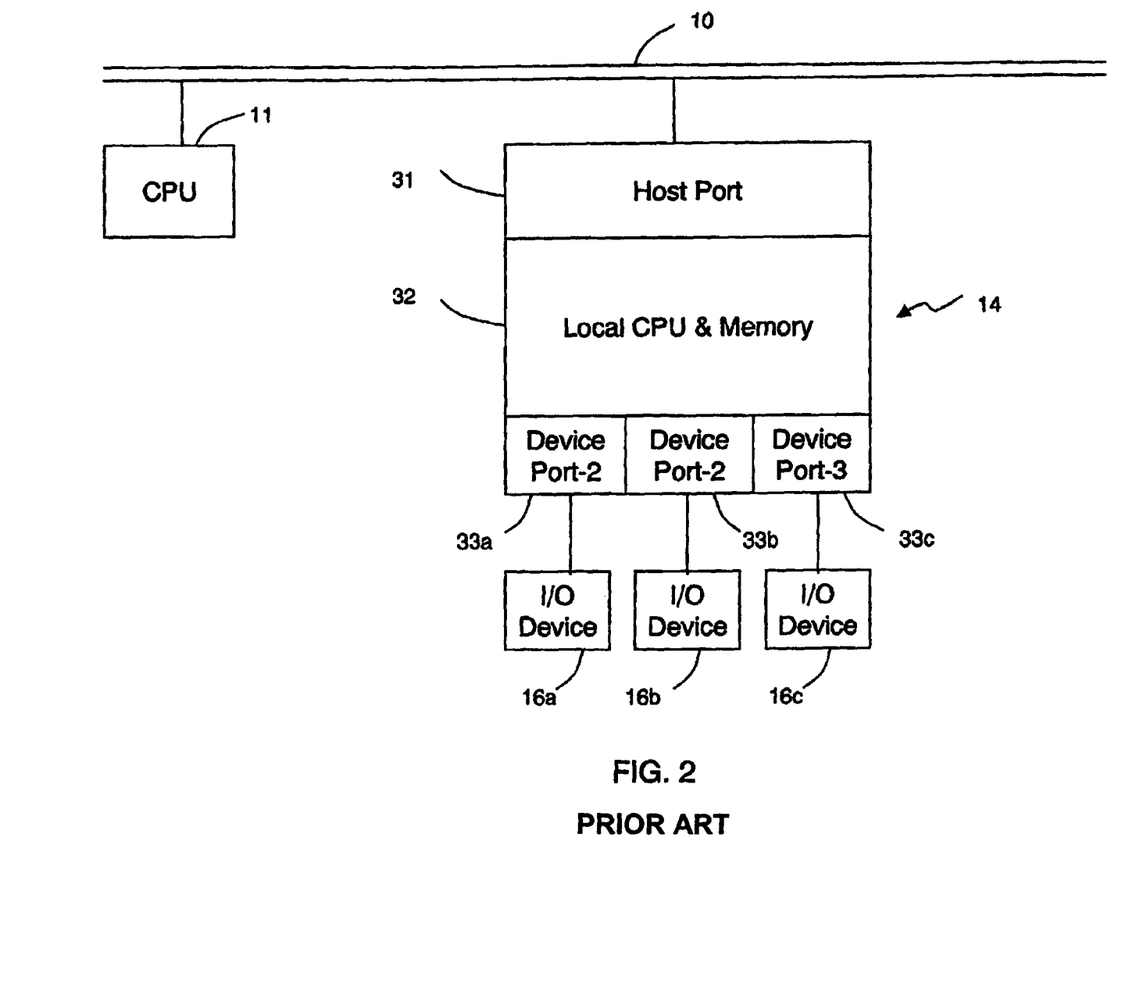
FIG. 2 is a block diagram of a general I/O subsystem.

FIG. 2 illustrates an I/O subsystem in general by further showing the details of device controller-2 14 of FIG. 1 responsible for necessary control and buffering needed for controlling the I/O devices 16a, 16b and 16c. A device controller in general is a protocol converter that converts an I/O command from a system bus to a hardware device into I/O signals for the device and converts data from the device to the system bus.

Device controller-2 14 has a local CPU & Memory 32 for protocol conversion of I/O commands, a host port to offering status and control information for the CPU 11, and a set of device ports, device port-2 33a, device port-3 33b and device port-3 33c for communicating data and control with I/O devices 16a, 16b and 16c, respectively. Device controller-2 14 may either be connected to the system bus 10 in a separate chip or connected to the CPU 10 internally.

Figure 3:
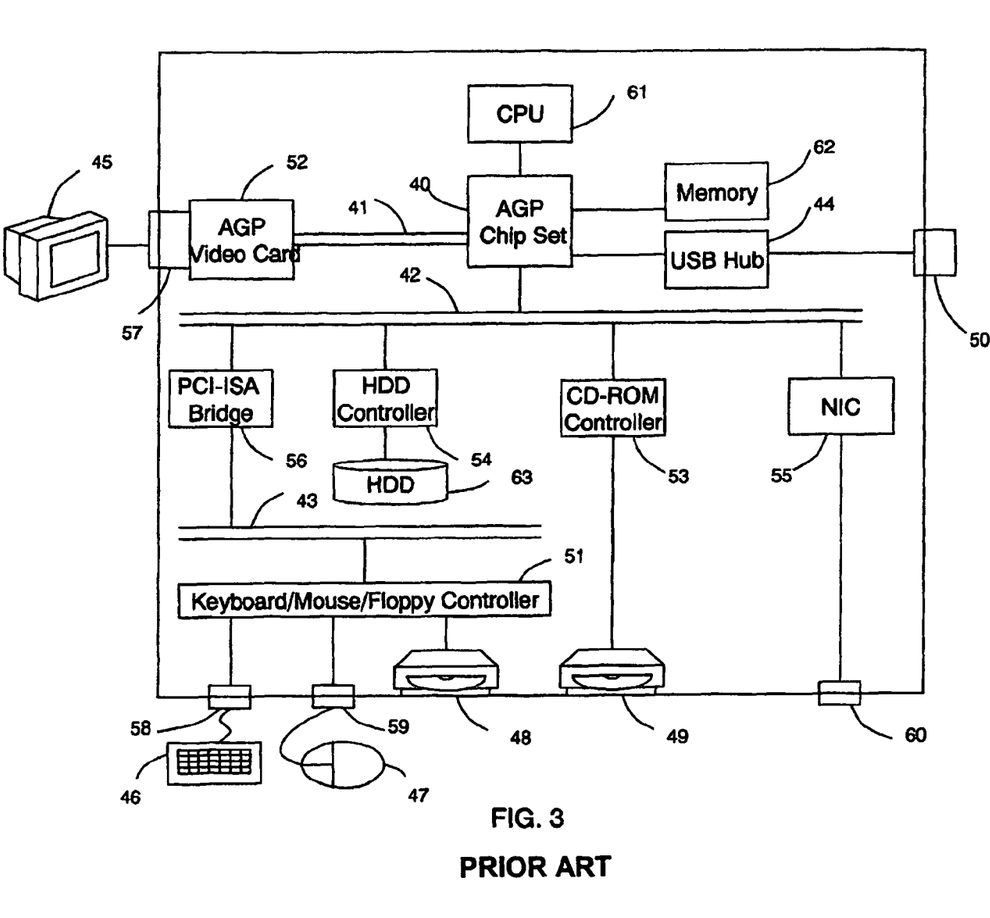
FIG. 3 is an illustration showing various devices attached to different kinds of bus in a system.

FIG. 3 illustrates various I/O devices attached to different kinds of bus in a PC system unit using an AGP (Accelerated Graphics Port) chip set. Device controllers are attached to an AGP bus 41, a PCI bus 42, an ISA bus 43, and a USB hub 44. A keyboard 46, a mouse 47, and a floppy drive 48 are connected to the PCI bus 42 through a device controller 51 (keyboard/mouse/floppy controller) attached to the ISA bus 43 that is connected to the PCI bus through a PCI-ISA bridge 56. A monitor 45 is connected to the system bus through an AGP video card 52 attached to the AGP bus 41. The monitor 45, keyboard 46, and mouse 47 are connected to the respective device controller through connectors 57, 58, 59, respectively. A CD ROM drive 49 is connected to the PCI bus 42 through a CD-ROM device controller 53. A hard disk drive (HDD) 63 is connected to the PCI bus 42 though a hard disk drive controller (HDD controller) 54. Connected to the PCI bus 42 is a network interface card (NIC) for connecting the system to a network through a network connector 60. The USB hubs 44 is connected to the PCI bus 42 through the AGP chip set 40. Some I/O devices are connected to the USB hub 44 through a USB port 50.

FIG. 3 is merely is an example of a particular way of attaching I/O systems. At times, I/O devices may be connected to a different kind of bus. For example, the monitor can be attached to a PCI bus through a video card rather than the AGP video card.

As shown in FIG. 3, hardware devices are physically attached to a system unit through device controllers. As a result, users are limited to the I/O device physically attached to host computer. To separate the users from the host computer, devices must be separated from the host computer through a network.

Separation and Connecting through LAN

Figure 4:
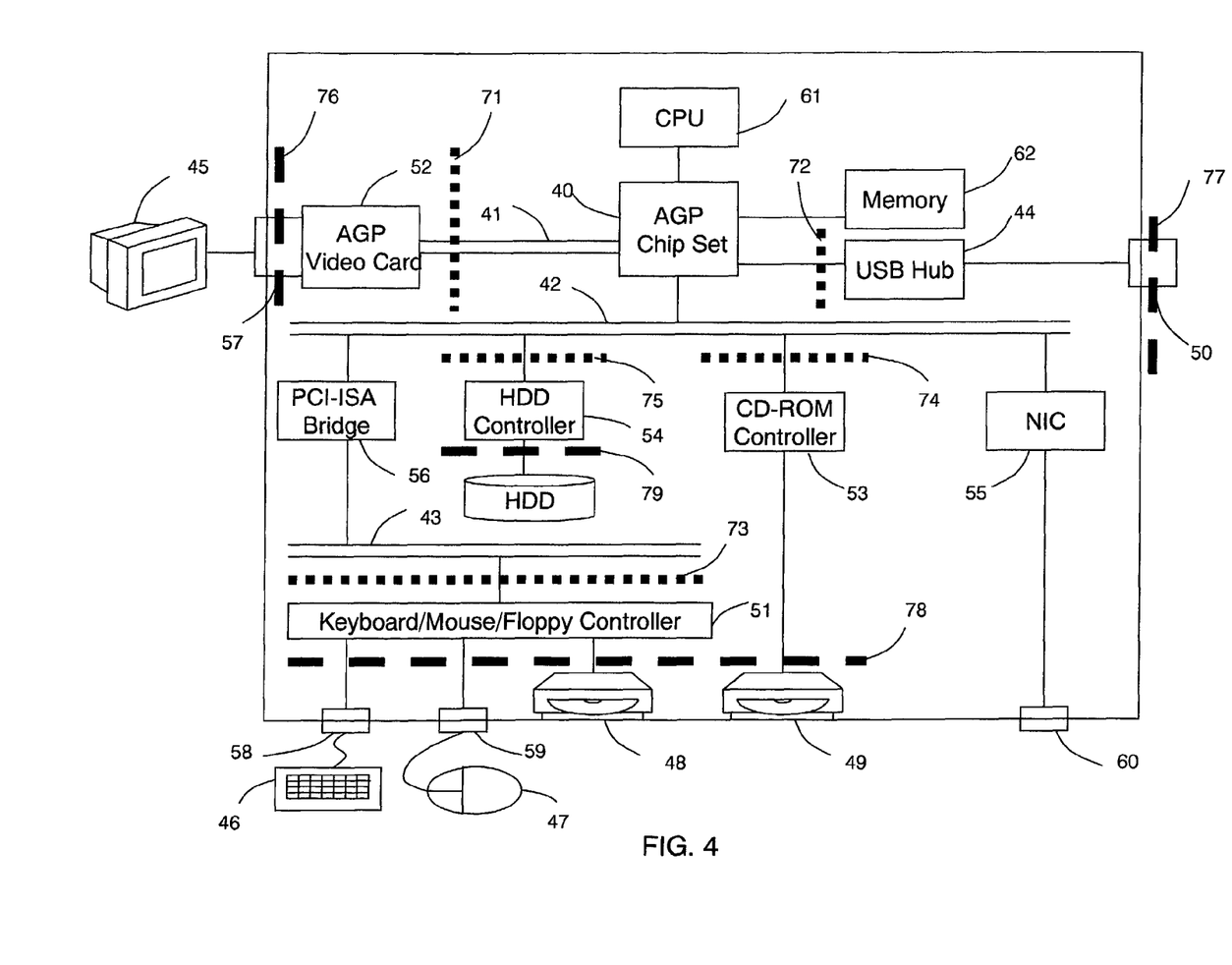
FIG. 4 is an illustration showing various ways of separating I/O devices from the system unit.

FIG. 4 shows various ways of separating I/O devices from the host system unit and connecting them through a local area network (LAN) such as Ethernet. A first set of cutting surfaces such as 71, 72, 73, 74 and 75 divides the device controller from the system bus, and connects them using a LAN. A second set of cutting surface such as 76, 77, 78 and 79 separates the devices from the device controllers to connect them using a LAN.

The choice of the cutting surface depends on the characteristics of the device controllers and the devices. Keyboards, mouse, floppy drives, CD-ROM drives, hard disk drives and USB devices are preferably separated by a cutting surface such as 78, 79, and 77 because the device controllers are usually attached to the system bus in a chip form. Monitors or audio devices are preferably separated by a cutting surface such as 71 so that device controllers are located at the device side, because users typically use video and audio devices through various kinds of device controller boards of the users' preference.

Data Link Frames

Data is moved through network in a logical data block called data link frames. Each data link frame encapsulates data to be carried, such as a packet, using a header and trailer for a specific LAN technology.

Regardless of which kind of the cutting surface used, a protocol converter is necessary to connect a host system with the devices through a LAN. A converter for converting I/O commands into data link frames for transmission through the LAN is necessary. A counter-converter is also necessary that converts the data link frames received through the LAN back to the I/O commands.

Figure 5A:
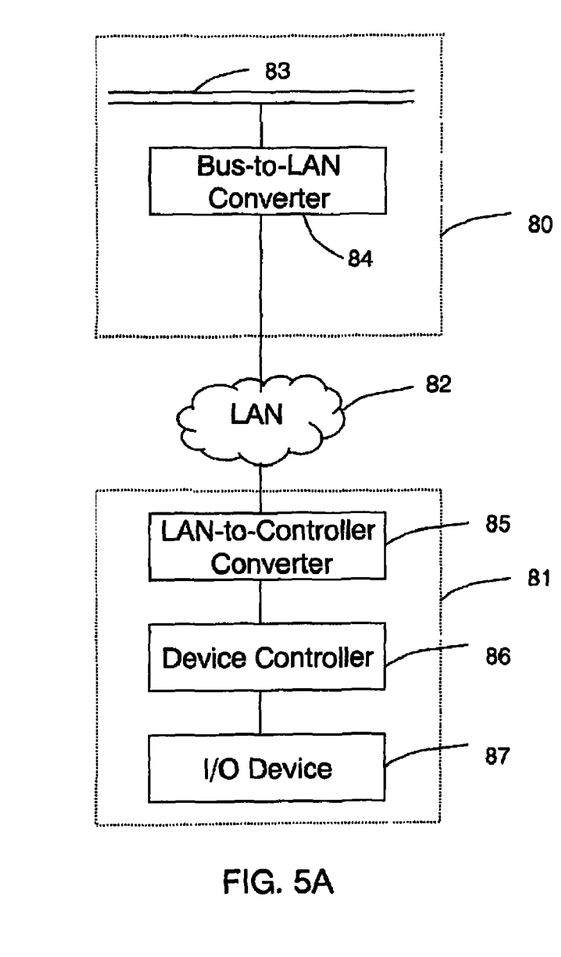
FIG. 5A is a block diagram of a system where the device controller is separated from the system bus.

FIG. 5A shows one kind of protocol converters that may be used where a device controller 86 is separated form a system bus and is connected by a LAN 82. Provided at the host side 80 is a bus-to-LAN converter 84 connected to the system bus 83 to convert I/O commands in the system bus 83 into data link frames by encapsulating the I/O commands in data link frames suitable for transmission through the LAN 82. The bus-to-LAN converter also retrieves I/O responses from the data link frame received from the device 81 through the LAN 82 containing I/O responses.

Provided at the device side 81 is an LAN-to-controller counter-converter for converting the data link frame received from the host through LAN into I/O commands for a device controller 86, which generates I/O control signals for the I/O device 87.

Figure 5B:
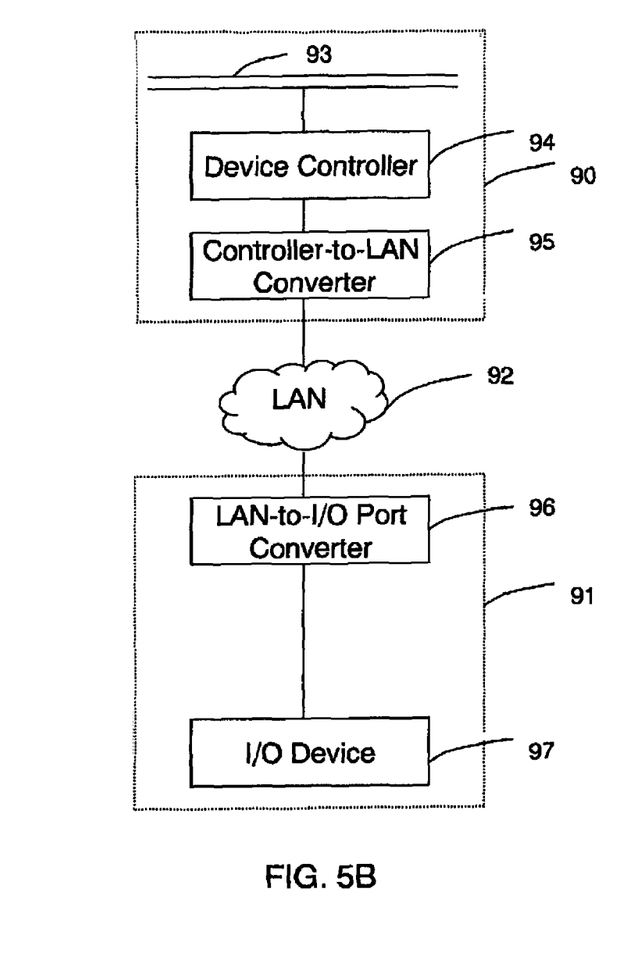
FIG. 5B is a block diagram of a system when the I/O devices are separated from the device controller.

FIG. 5B shows another kind of the protocol converters that may be used when a device controller 94 and an I/O device 97 are separated and connected by a LAN 92. While leaving the device controller 94 connected to the system bus 94, a controller-to-LAN converter 95 is provided at the host side 90 to convert the I/O control signals from device controller to data link frames by encapsulating the I/O control signals in data link frames suitable for transmission through the LAN 92. Also provided at the device side 91 is an LAN-to-I/O Port counter-converter 96 for converting the data link frames into I/O control signals to control I/O device 97.

Figure 6:
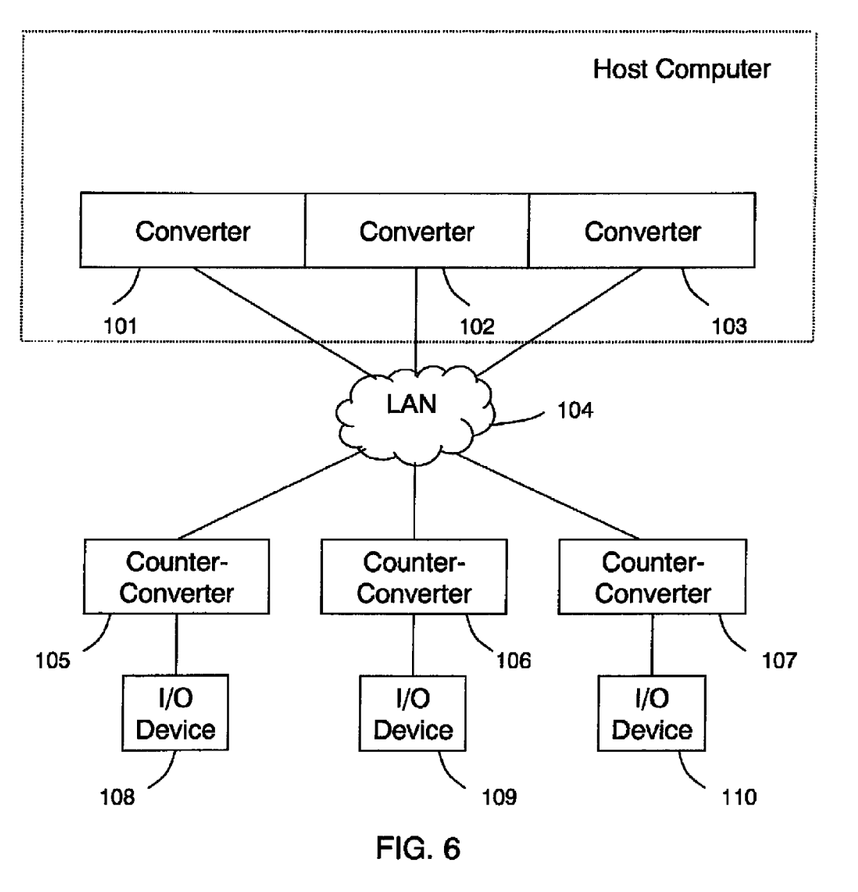
FIG. 6 is an illustration of a system using independent data links.

FIG. 6 illustrates the case where independent data links are used to connect I/O devices. Converters 101, 102 and 103 (either bus-to-LAN converters or controller-to-LAN converters) in the host computer are connected to I/O devices 108, 109 and 110 through a LAN 104 using independent data links through respective counter-converters 105, 106 and 107. The converters 101, 102 and 103 may preferably be located in a system case.

Figure 7:
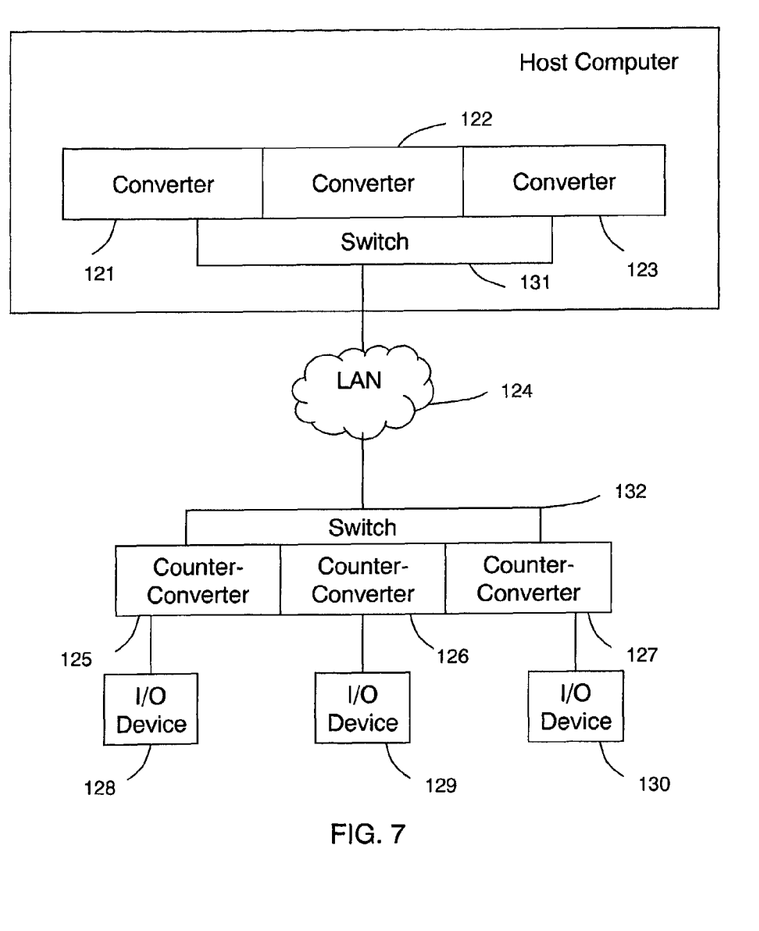
FIG. 7 is an illustration of a system using a switched data link.

FIG. 7 illustrates the case where a switched data link is used. Converters 121, 122 and 123 are connected to a LAN 124 using a switch 131 so that a shared data link is used rather than separate, independent links. Similarly, counter-converters 125, 126 and 127 are connected to the LAN 124 using a switch 132 to share a data link.

Relatively slow-speed devices such as a keyboard and a mouse may be connected using a switched data link as shown in FIG. 7, whereas relative high-speed devices such monitor, audio, hard disk may be connected using independent data links as shown in FIG. 6.

Flow Control

Since the converter is a protocol converter that converts the protocol of the signal carrying an I/O command at one end to the protocol of the signal carrying the same I/O command at the other end, there is a need for a buffer to compensate for the difference in speed at each side. For example, when a monitor is separated from the system bus and Ethernet is used to connect them, the converter needs a buffer to prevent loss of frames due to the speed difference if the Ethernet speed is slower than the system bus speed. This flow control is also needed when the system bus data transmission unit is larger than an Ethernet frame. The data unit must be segmented before being transmitted in Ethernet frames. When the Ethernet frames are received at the device end, they must be reassembled.

LAN Protocol

In the present invention, I/O commands and data are encapsulated in data link frames of a particular LAN. Since connections are made in a data link level, the transmission is independent of an upper-level protocol such as TCP/IP used as an underlying protocol. For example, I/O devices can be separated from the system bus and connected through LAN regardless of whether TCP/IP is used as an upper-level communication protocol.

The present invention differs from a network interface card (NIC). The NIC typically processes communication protocols in general including upper-level protocols such as the TCP/IP protocol as well as lower-level protocols such as data link frames. The converter of the present invention is different from NIC in that the converter is a specialized network interface that encapsulates the I/O commands and data to data link frame so as transmit them to an I/O device through a network without the overhead of processing communication protocols in general.

Device Driver

A device driver is software that governs a device controller. Because the present invention uses protocol converters in a transparent manner, there is no need to change the existing device driver software.

Selective Connection Between I/O Devices and Host Computer

In the present invention where a LAN is preferably used to exchange data from I/O devices and the host computer, the converters and counter-converters should be able to distinguish data link addresses so that data frames can be sent to the corresponding host or I/O devices.

If Ethernet is used for the LAN, for example, the converters and counter-converters should have different Ethernet addresses. Each converter or counter-converter must use the Ethernet address of the destination converter or counter-converter. Therefore, if data link addresses cannot be altered, the connections become fixed.

Although fixed connections may be used such as in a short-distance application, variable connections is useful to deal with a changed environment. To change a connection, the destination data link address should be changed.

To selectively designate a destination data link address, either a hardware switch or a device driver software switch can be used. When a hardware switch is used, the user has to enter the address manually. When a device driver software switch is used, the destination address can be changed using software means.

If the destination address is changed using software means, such as through device driver, I/O devices can be dynamically connected to or separated from the host computer. Dynamic connection/separation allows a user to connect the user's I/O devices and hard disk drive to the computer having the performance and specification of the user's choice. It also allows a user to connect to several host computers simultaneously to execute more tasks. It also allows users to time-share host computers and to use another computer when one computer is down for repair or upgrade.

Establishment and Canceling of Connection As mentioned before, I/O devices including hard disk drives can be connected dynamically to any of the host computers by establishing a connection and canceling the connection.

The connection establishment protocol is as follows: (1) Using an I/O device, such as a keyboard or a mouse, whose connection has not been established yet, a frame of a predetermined type requesting for connection establishment is broadcasted or multicast to the host computers connected to the LAN. The connection-establishment request frame contains the address of the corresponding counter-converter connected to the I/O device, and information necessary to designate the host computer to be connected such as the host computer ID or the performance of the host computer desired. (2) The designed host computer accepts the request by sending a reply frame to the requesting I/O device. The reply frame contains the addresses of the accepting host computer, such as the data link address of the corresponding converter connected to the host computer. (3) Once the connection is established, exclusive communication of I/O commands and data is realized between the host computer and the I/O device through the corresponding converter and the counter-converter.

The connection canceling protocol is as follows: (1) A frame of a predetermined type requesting for canceling the connection is sent to the host computer as well as to the corresponding hardware devices. (2) Upon receiving the connection-canceling request frame, the host computer instructs its converter to stop transmitting I/O commands or data until a new frame requesting for connection establishment arrives.

Although above-mentioned connection establishment/canceling protocol was described as initiated from the I/O device, those skilled in the art would appreciate that the protocol can be made to initiate from the host computer.

Alternative Embodiment

Figure 8A:
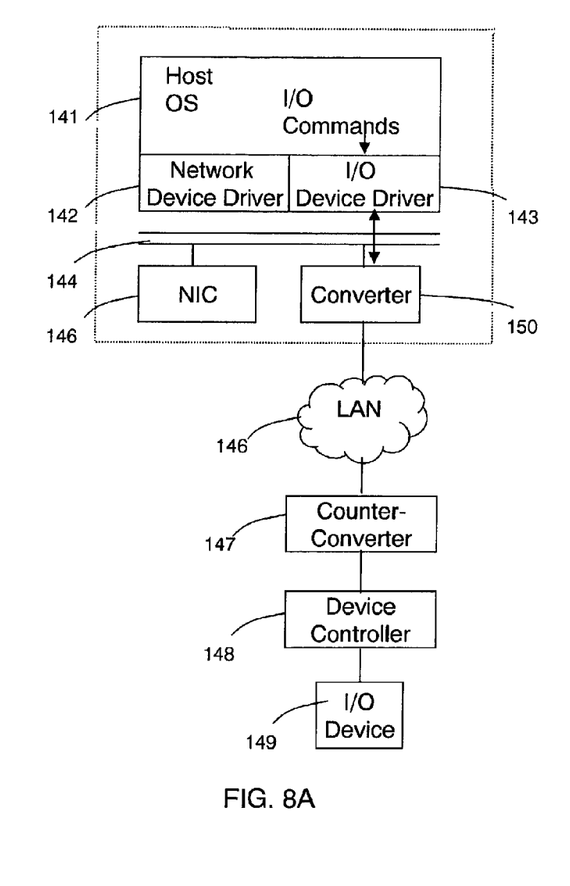
FIG. 8A is a block diagram of an implementation using an I/O device driver.

FIG. 8A shows the previously discussed embodiment using a pair of a converter and a counter-converter. The operating system 141 sends I/O commands to an I/O device driver 143 controlling a converter 150. The converter 150 then encapsulates the I/O commands in data link frames and send them to an I/O device 149 through a LAN 146, a counter-converter 147, a device controller 148. In this case, the converter 150 is provided to connect I/O devices through the network 146 independently of and in addition to a network interface card (NIC) 145 for a general networking purpose.

Figure 8B:
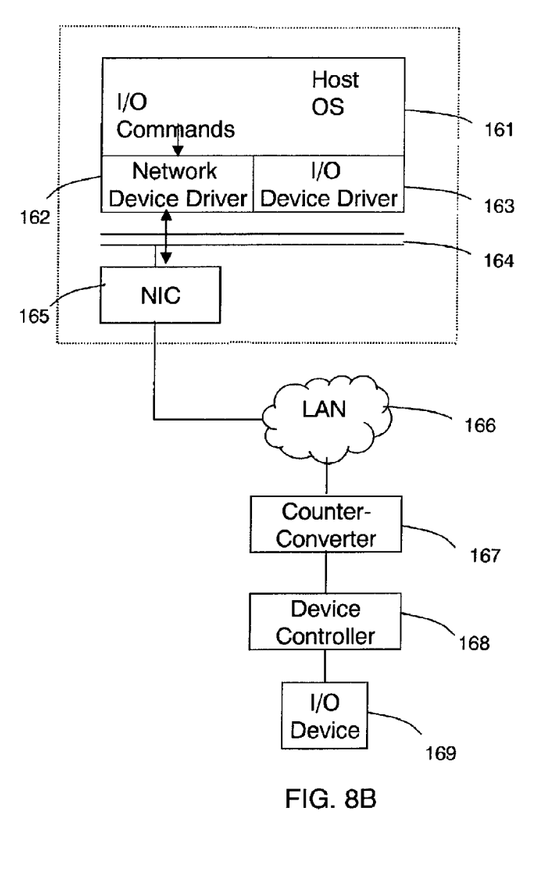
FIG. 8B is a block diagram of an alternative implementation using a network device driver.

FIG. 8B shows an alternative embodiment using a network interface card. Instead of sending I/O commands to an I/O device driver, the operating system 161 sends I/O commands to a network device driver 162 controlling a network interface card (NIC) 165. The NIC 165 then encapsulates the I/O commands received in network packets to send them an I/O device 169 through a LAN 166.

An operating system (OS) typically sends an I/O command to a controller controlling a target device. In this case, however, instead of sending an I/O command to a controller, the OS sends a packet containing an I/O command to the NIC so that the I/O command is delivered to the target device 169 through the network and the counter-counter 167 retrieves the I/O command from the network packet. Data transmission from the target device to host computer is achieved through a network packet in a similar fashion.

At the device side, the counter-controller 167 is still necessary for retrieving I/O commands from the network packets containing the I/O commands. The device controller 168 receives the I/O commands and generates necessary signals to control the I/O device 169.

Figure 9A:
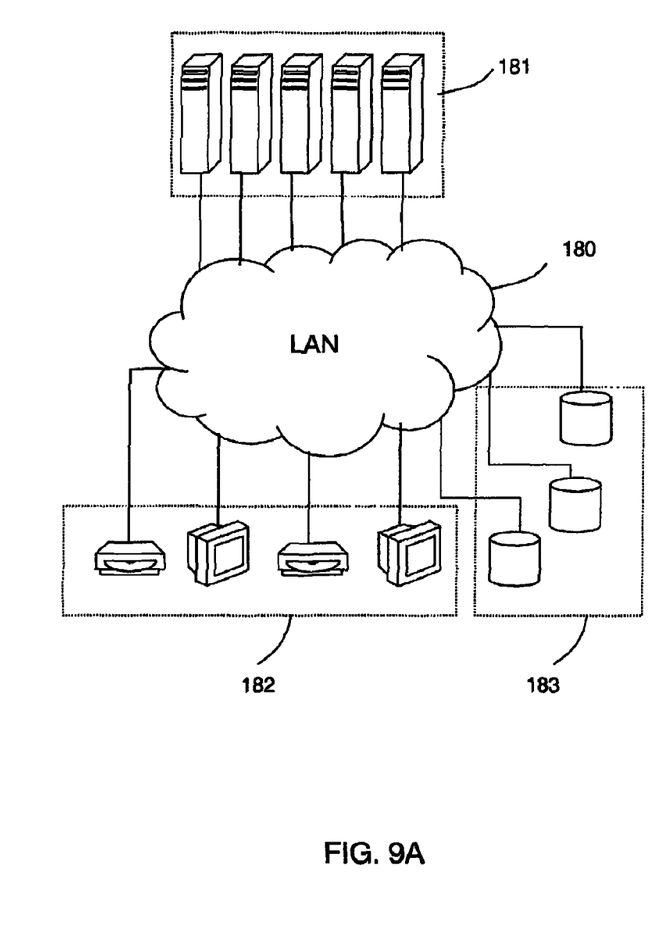
FIG. 9A shows an example of network connections where one LAN is used to connect system units, I/O devices, and hard disk drives.

FIG. 9A shows an example of network connections where one LAN 180 is used to connect system units 181, I/O devices 182, and hard disk drives 182. As mentioned before, the LAN 180 provides dynamic setting and canceling of connections among the systems 181, I/O devices 182 and hard disk drives 182.

Figure 9B:
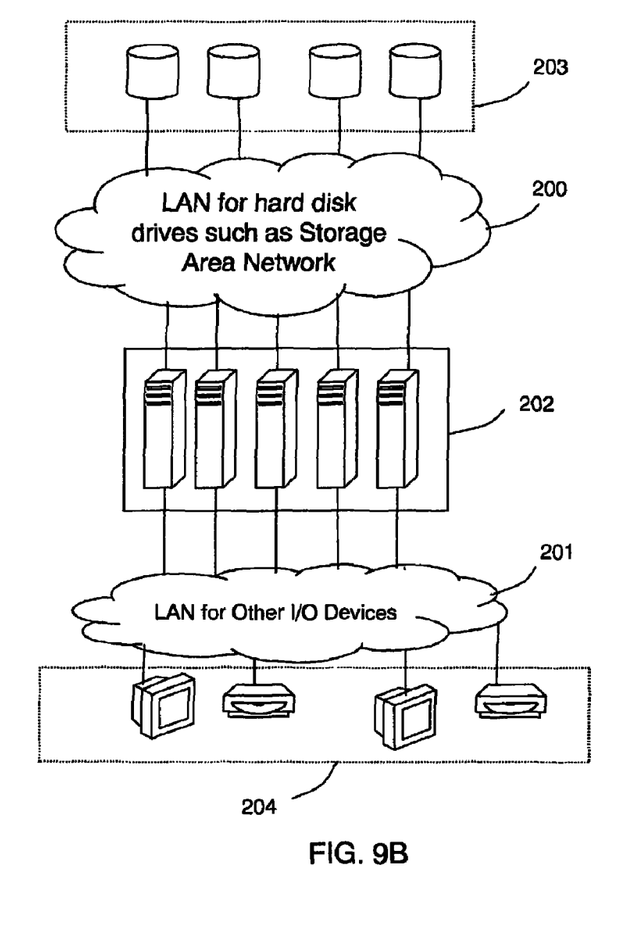
FIG. 9B shows another example of network connection where two separate LANs are used for connecting system units: one with hard disk drives and the other with other I/O devices.

FIG. 9B shows another example of network connection where two separate LANs are used: one 200 for interconnecting hard disk drives 203 with the system units 202 and the other 201 for interconnecting I/O devices 204 with the system units 202. Unlike other I/O devices, hard disk drives need not be located near the users. If a separate LAN is used to connect hard disk drives, a specialized LAN dedicated to storage such as Storage Area Network (SAN), which solves the problem of restricted bandwidth associated with a LAN connecting other I/O devices.

Advantages

There are numerous advantages from using the present invention. Since I/O devices are physically separated from the host computer, the users using the I/O devices are also made physically separate from the host computer, which solves the problems associated with noise, heat, and occupying space.

Since I/O devices can be dynamically connected to any of the host computers, the user can connect to the host computer of choice having the desired specification and performance as well as to more than one computer simultaneously.

Since I/O devices can be conveniently disconnected from and connected to the host computers, economical use of the host computer is possible through time-sharing of host computers. Even during the down time when one of the host computers is down for repair or upgrade, the users can continue to access a computer by connecting to another host computer.

Since I/O devices do not need power from the host system unit, the size of the host system unit can be minimized, greatly reducing the problem of electromagnetic noise, etc.

Since users are not tied to a particular host computer, which is also not tied to a particular I/O devices (including a hard disk drive), the present invention allows users to access any host computer in the network using different I/O devices (including the user's hard disk) in a different location, providing greater mobility and portability.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

What is claimed is:

1. A system for dynamically connecting I/O devices through a network, comprising:
    a bus-to-LAN converter at a host side for sending I/O commands from a host computer to I/O devices through a network, comprising:
        a network interface card (NIC) for encapsulating an I/O command into one or more network packets, wherein I/O commands are same as commands to control I/O devices attached to the host computer;
        a transmitter for sending the network packets through the network to a target I/O device; and
        a first connection establishment and canceling module for dynamically connecting at least one I/O device to the host computer and dynamically separating the I/O devices from the host computer, and
    a LAN-to-Controller converter at an I/O device side for receiving I/O commands from the host computer through the network, comprising:
        a receiver for receiving network packets containing an I/O command from the network;
        a counter-controller for retrieving I/O commands from the network packets containing the I/O commands; and
        a second connection establishment and canceling module for dynamically connecting at least one I/O device to the host computer and dynamically separating the I/O devices from the host computer.

2. The system of claim 1, wherein the network is Ethernet.

3. The system of claim 1, wherein the network is wireless.

* * * * *